(12) United States Patent
Hrib et al.

(10) Patent No.: US 10,748,359 B2
(45) Date of Patent: Aug. 18, 2020

(54) METHOD AND SYSTEM FOR DATA REPORTING USING CUSTOMIZED TRIGGERS

(71) Applicant: HONEYWELL INTERNATIONAL INC., Morris Plains, NJ (US)

(72) Inventors: Dalibor Hrib, Olomouc (CZ); Ondrej Kutal, Kanice (CZ); Jakub Kadlas, Prerov (CZ)

(73) Assignee: Honeywell International Inc., Morris Plains, NJ (US)

( * ) Notice: Subject to any disclaimer, the term of this patent is extended or adjusted under 35 U.S.C. 154(b) by 255 days.

(21) Appl. No.: 15/878,676

(22) Filed: Jan. 24, 2018

(65) Prior Publication Data

US 2019/0228599 A1 Jul. 25, 2019

(51) Int. Cl.
*G07C 5/08* (2006.01)
*H04L 12/40* (2006.01)
*H04L 12/26* (2006.01)
*G07C 5/00* (2006.01)
*B64D 45/00* (2006.01)
(Continued)

(52) U.S. Cl.
CPC ............ *G07C 5/085* (2013.01); *B64D 45/00* (2013.01); *G06F 16/24565* (2019.01); *G07C 5/008* (2013.01); *G07C 5/08* (2013.01); *H04L 12/40032* (2013.01); *H04L 43/067* (2013.01);
(Continued)

(58) Field of Classification Search
CPC .................................................. G07C 5/085
See application file for complete search history.

(56) References Cited

U.S. PATENT DOCUMENTS 7,912,592 B2 * 3/2011 Komer ................ G10L 15/26
701/3
9,346,557 B2 * 5/2016 Jesse ..................... B64D 45/00
(Continued)

FOREIGN PATENT DOCUMENTS

EP 2348488 A1 7/2011
EP 3156977 A1 4/2017

OTHER PUBLICATIONS

InFlight Labs, Llc, "InFlight Labs New "Smart Emergency Location Transmitter" Tracks Any Missing Aircraft with "One Touch" From ATC Command," China Weekly News [Atlanta], Apr. 28, 2015.

*Primary Examiner* — Alex C Dunn
(74) *Attorney, Agent, or Firm* — Bookoff McAndrews, PLLC

(57) ABSTRACT

Methods and systems for data recording for an aircraft are provided. The method includes a ground station (GS) module external to the aircraft, and a trigger module onboard the aircraft. The GS module performs: creating a trigger library comprising multiple trigger logic modules based on a first user input and aircraft specific parameters; generating an aircraft-specific configuration file (CF) based on a second user input and the trigger logic library; and transmitting the CF to the trigger module. The trigger module performs: receiving the CF; receiving and processing the CF with various aircraft signals during aircraft operation to monitor for triggers; and, responsive to determining that the trigger occurred, (i) recording data bus activity for a duration of time associated with the trigger identity, (ii) generating a customized data report (CDR) including the record of data bus activity, and (iii) transmitting the CDR to the GS module.

15 Claims, 3 Drawing Sheets

(51) Int. Cl.
*G06F 16/2455* (2019.01)
*H04L 29/08* (2006.01)
(52) U.S. Cl.
CPC ...... *B64D 2045/0085* (2013.01); *H04L 67/12* (2013.01); *H04L 2012/4028* (2013.01)

(56) References Cited

U.S. PATENT DOCUMENTS

| | | | |
|---|---|---|---|
| 9,620,020 | B2 | 4/2017 | Wang et al. |
| 9,738,398 | B1* | 8/2017 | Wang ............... B64D 45/00 |
| 9,746,851 | B2 | 8/2017 | Chai et al. |
| 2002/0113720 | A1* | 8/2002 | Derderian ........... G11B 27/034 340/965 |
| 2013/0197725 | A1* | 8/2013 | O'Dell ................. H04L 67/125 701/14 |
| 2015/0327307 | A1* | 11/2015 | Randrianasolo ...... H04W 12/04 370/329 |
| 2016/0071335 | A1* | 3/2016 | Schmitz ................ G07C 5/008 701/29.1 |
| 2016/0233948 | A1 | 8/2016 | Le Bigot et al. |
| 2016/0318622 | A1* | 11/2016 | Haukom ............... B64D 45/00 |
| 2017/0063944 | A1 | 3/2017 | Nyikos et al. |
| 2017/0063995 | A1* | 3/2017 | Gunn ................... B60R 16/023 |
| 2017/0241798 | A1* | 8/2017 | Van Den Bergh ........ B64F 5/60 |
| 2017/0263135 | A1 | 9/2017 | Rezaei Gerovi |
| 2017/0301247 | A1 | 10/2017 | Sherry et al. |
| 2017/0313425 | A1* | 11/2017 | Senet ................. B64D 11/0015 |
| 2017/0324437 | A1 | 11/2017 | Ruttler et al. |

* cited by examiner

METHOD AND SYSTEM FOR DATA REPORTING USING CUSTOMIZED TRIGGERS

TECHNICAL FIELD

The present invention generally relates to mobile platform data reporting systems, and more particularly relates to methods and systems for data reporting using customized triggers.

BACKGROUND

Mobile platforms, such as aircraft, comprise multiple subsystems, each generating a tremendous amount of data. The data is then communicated via one or more data busses, such as, an aircraft Avionics Standard Communication Bus (ASCB), during operation. In order to study aircraft operation and increase design and operational efficiency, it is desirable to record this data, and have it readily available for review as necessary. However, on-board storage space is limited, therefore determining what data is recorded, and when, is necessary.

Determining a set of triggers (to record data) in advance of operation and recording only a preselected set of parameters may help, but since it is difficult to determine in advance what data may be needed to study an issue, it may still be desirable to record all of the data made available on all of the busses. Therefore, solutions tend to result in unwieldy database size, or inadequate stored data.

Accordingly, improved methods and systems for data reporting directed to controlling time frames for data recording, enabling modular construction, and enabling reuse of triggers by multiple stakeholders are desired. Desirable systems and methods also minimize certification requirements of on-board software. Furthermore, other desirable features and characteristics of the present disclosure will become apparent from the subsequent Detailed Description and the appended claims, taken in conjunction with the accompanying drawings and this Background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A data reporting system for a platform is provided, the system comprising: a navigation system providing navigation data; an avionics system providing avionics data; a trigger module operatively coupled to the navigation system and the avionics system, and configured to process a platform-specific configuration file (CF) during platform operation and generate therefrom a customized data report (CDR); and a ground station (GS) module external to the platform, the GS module configured to generate the platform-specific configuration file (CF); and wherein the trigger module is configured to: process the avionics data and the navigation data with the CF to: determine (a) that a trigger occurred, and (b) a trigger identity; responsive to determining that a trigger occurred, record data bus activity for a duration of time associated with the trigger identity in the CF; generate the CDR including the record of data bus activity; and transmit the CDR to the GS module via a wireless communication link; and the GS module is configured to: reference trigger logic in a trigger logic library and aircraft (A/C) specific parameters based on a first user input to generate therefrom the platform-specific CF, wherein the trigger logic includes a first plurality of predefined trigger logic modules, each being platform-specific and directed to one or more categories from the set including: safety, engine status, fault detection, and avionic system status; and transmit the CF to the trigger module via the wireless communication link; and responsive to receiving the CDR, (a) process the CDR with a second user input to thereby identify a trigger logic update; (b) update a trigger library with a revised trigger logic; and (c) revise the CF responsive to the revised trigger logic.

A method for data reporting for a platform is provided. The method comprising: at a trigger module, receiving navigation data; receiving avionics data; processing the avionics data and the navigation data with a platform-specific configuration file (CF) during platform operation to determine (a) whether a trigger occurred, and (b) a trigger identity; responsive to determining that a trigger occurred, (i) recording data bus activity for a duration of time associated with the trigger identity, (ii) generating a customized data report (CDR) including the record of data bus activity; and (iii) transmitting the CDR to a ground station (GS) module external to the platform, via a wireless communication link; and at the ground station (GS) module, referencing trigger logic in a trigger logic library and aircraft (A/C) specific parameters based on a first user input to generate therefrom the platform-specific CF, wherein the first user input represents a first user-specific selection of trigger logic modules in the trigger logic library; transmitting the CF to the trigger module via the wireless communication link; and responsive to receiving the CDR, (a) processing the CDR with a second user input to thereby identify a trigger logic update; and, (b) updating a trigger library with a revised trigger logic.

Also provided is a method for data reporting for an aircraft. The method comprising: at a ground station (GS) module external to the aircraft, creating a trigger library comprising multiple trigger logic modules based on a first user input and aircraft specific parameters, the trigger logic modules each being platform-specific and directed to one or more categories from the set including: safety, engine status, fault detection, and avionic system status; generating an aircraft-specific configuration file (CF) based on a second user input and the trigger logic library; and transmitting the CF to a trigger module in the aircraft via a wireless communication link; and at the trigger module, receiving the platform-specific configuration file (CF); receiving navigation data, avionics data, and sensor system data; processing the avionics data, the navigation data, and the sensor system data with the (CF) during aircraft operation to monitor for triggers; determining (a) that a trigger occurred, and (b) a trigger identity; and responsive to determining that the trigger occurred, (i) recording data bus activity for a duration of time associated with the trigger identity, (ii) generating a customized data report (CDR) including the record of data bus activity; and (iii) transmitting the CDR to the GS module.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention that is defined by the claims. Furthermore, there is no intention to be bound by any theory presented in the preceding background or the following detailed description.

Figure 1:
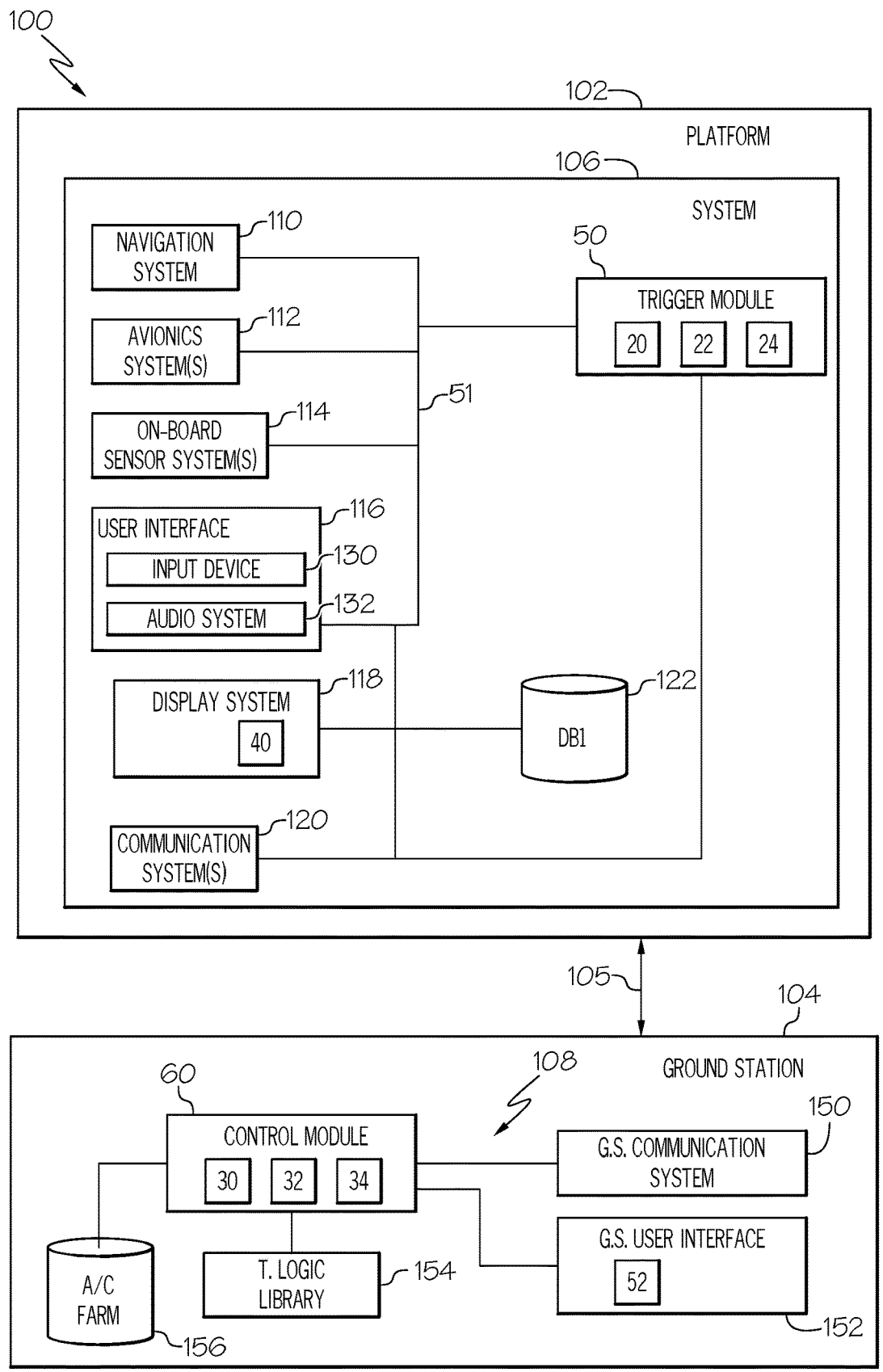
FIG. 1 is a block diagram of a data recording system, in accordance with an exemplary embodiment.

Exemplary embodiments of the novel disclosed data reporting system (FIG. 1, 100) provide a technologically improved method and system to generate data reports by allowing customers to select from multiple predefined trigger logic modules that each have respective data recording times. The disclosed data reporting system 100 enables reuse of the multiple predefined trigger logic modules by multiple customers. The disclosed data reporting system 100 further partitions hardware and software functionality between a platform (FIG. 1, 102) and a ground station (FIG. 1, 104). A streamlined executable file (program) is loaded onto the platform 102, and the more frequently changed software, such as the multiple trigger logic modules, are stored and revised off of the platform 102. The novel data reporting system 100 minimizes certification efforts of on-platform software via the partitioning of the files. Operation of the data reporting system 100 includes communications between the platform 102 and the ground station 104, via a communications link (FIG. 1, 105).

Turning now to FIG. 1, in an embodiment, the data reporting system 100 comprises a trigger system 106 and a ground station (GS) system 108 operatively coupled via the communications link 105. The trigger system 106 is generally located in a mobile platform 102, whereas the GS system 108 is external to the platform 102, and envisioned to be at a ground station 104. In various embodiments, the platform 102 is an aircraft, and is referred to as aircraft 102. The aircraft 102 may be a first aircraft of a plurality of aircraft, each having therein a respective trigger system 106 configured to communicate with the GS system 108. Accordingly, the GS system 108 is configured to individually and concurrently communicate with a plurality of aircraft 102.

As used herein, the term "module" refers to any hardware, software, firmware, electronic control component, processing logic, and/or processor device, individually or in any combination, configured to facilitate communications and/or interaction between the elements of the data reporting system 100 and perform additional processes, tasks and/or functions to support operation of the data reporting system 100, as described herein. Depending on the embodiment, the modules may be implemented or realized with a general purpose processor (shared, dedicated, or group) controller, microprocessor, or microcontroller, and memory that executes one or more software or firmware programs; a content addressable memory; a digital signal processor; an application specific integrated circuit (ASIC), a field programmable gate array (FPGA); any suitable programmable logic device; combinational logic circuit including discrete gates or transistor logic; discrete hardware components and memory devices; and/or any combination thereof, designed to perform the functions described herein.

The trigger system 106 embodies a trigger module 50. The trigger module 50 may be separate from, or integrated within, a preexisting mobile platform management system, avionics system, flight controls system (FCS), or aircraft flight management system (FMS). The GS system 108 embodies a ground station (GS) module 60. In various embodiments, the trigger module 50 comprises a processor 20, memory comprising a novel program 22, and I/O interface 24, and the GS module 60 comprises a processor 30, memory comprising a novel program 32, and I/O interface 34. In accordance with one or more embodiments, the novel program 22 and novel program 32 are each embodied in a memory (e.g., RAM memory, ROM memory, flash memory, registers, a hard disk, or the like) or another suitable non-transitory short or long term storage media capable of storing computer-executable programming instructions or other data for execution. In practice, program 22 and program 32 each include rules and instructions which, when executed, cause the data reporting system 100 to perform the functions, techniques, and processing tasks associated with the operation of the data reporting system 100 described in greater detail below.

The trigger module 50 communicates with multiple aircraft systems via an avionics standard communication bus (ACSB), data bus 51. The trigger module 50 may be operatively coupled to any combination of the following aircraft systems: a navigation system 110, one or more avionics systems 112, one or more on-board sensor systems 114, a user interface 116, a display system 118, a communications system 120, and one or more data storage elements (DB 1) 122. The functions of these aircraft systems, and their interaction, is described in more detail below. The data and information provided by the multiple aircraft systems is collectively described as data bus activity (in other words, data bus activity comprises, without limitation, changes in navigation data, avionics data, onboard sensor system data, and communication system data, over time). As an overview, the trigger module 50 is configured to process a platform-specific configuration file (CF), to monitor and record data bus activity pursuant thereto, and to generate therefrom a customized data report (CDR), described in more detail below.

Still referring to FIG. 1, in an exemplary embodiment, the trigger module 50 is coupled to the navigation system 110, which, as used herein, comprises a flight management system FMS, and is configured to provide real-time navigational data and/or information regarding operation of the aircraft 102, including real-time flight guidance for aircraft 102. The navigation system 110 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 110, as will be appreciated in the art. The navigation system 110 is capable of obtaining and/or determining the instantaneous position of the aircraft 102, that is, the current (or instantaneous) location of the aircraft 102 (e.g., the current latitude and longitude) and the current (or instantaneous) altitude (or above ground level)

for the aircraft 102. The navigation system 110 is also capable of obtaining or otherwise determining the heading of the aircraft 102 (i.e., the direction the aircraft is traveling in relative to some reference), and to compare the instantaneous position of the aircraft 102 with an intended flight plan for the aircraft 102. The various data, information, and guidance, determined by the navigation system 110, are referred to herein as navigation data. Navigation data is made available to the data bus 51 such that one or more of the other onboard systems 112, 114, 116, 118, 120, and the trigger module 50, may further process and/or handle the navigation data.

The avionics system(s) 112 include numerous systems for obtaining and/or providing real-time flight-related data and information. For example, avionics systems 112 may include any combination of: a weather system, an air traffic management system, a radar system, a traffic avoidance system, an autopilot system, an auto thrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system. Each of these avionics systems 112 generates respective data; the entirety of data from the avionics system(s) 112 is referred to herein as avionics data. Avionics data is made available to the data bus 51 such that one or more of the other onboard systems 110, 114, 116, 118, 120, and the trigger module 50, may further process and/or handle the avionics data.

In the illustrated embodiment, the onboard sensor system(s) 114 generally represent the component(s) of the aircraft 102 that sense, detect, or otherwise identify a respective status of various aircraft systems and subsystems. For example, the onboard sensor system(s) 114 may sense status of a specific avionics system 112, subsystem, surface, component, line replacement unit (LRU), or the like. The sensor system(s) 114 provides sensor data including real-time system status data to the data bus 51. The sensor system(s) 114 also provide a respective status of objects or regions of interest in the vicinity of the aircraft 102. For example, an onboard sensor system 114 may be realized as a weather radar system or other weather sensing system that measures, senses, or otherwise detects meteorological conditions in the vicinity of the aircraft 102. The sensor data, therefore, comprises real-time system status data and weather data. The sensor system(s) 114 provides sensor data to the data bus 51 such that one or more of the other onboard systems 110, 112, 116, 118, 120, and trigger module 50 may further process and/or handle the sensor data.

The user interface may include, without limitation, an input device 130 and an audio system 132. The user input device 130 is coupled to the trigger module 50, and the user input device 130 and the trigger module 50 are cooperatively configured to allow a user (e.g., a pilot, co-pilot, or crew member) to interact with the display device 40 and/or other elements of the data reporting system 100, as described in greater detail below. Depending on the embodiment, the user input device 130 may be realized as a keypad, touchpad, keyboard, mouse, touch panel (or touchscreen), joystick, knob, line select key or another suitable device adapted to receive input from a user. The audio system 132 may include an audio input device, such as a microphone, audio transducer, audio sensor, or the like, that is adapted to receive voice input, thus allowing a user to provide audio input triggers to the data reporting system 100 in a "hands free" manner without requiring the user to move his or her hands, eyes and/or head to interact with the data reporting system 100. The audio system 132 may also include any suitable audio input device to detect/monitor cabin noise. Audio output data from the audio system 132 is made available on the data bus 51 for further use and processing. In various embodiments, the trigger module 50 comprises rules and instructions to processes audio output data to identify (i) words or phrases that indicate distress (such as "fire") and (ii) unusual noises (such as rattling or knocking sounds).

In the illustrated embodiment, the trigger module 50 is also coupled to the communications system 120, which is configured to support communications to and/or from the aircraft 102 via the communications link 105. The communications link 105 may comprise one or more wireless communication networks, such as a datalink, a communication management function (CMF) uplink, and a terminal wireless local area network (LAN) unit (TWLU). The communications system 120 may include a data link system, automatic dependent surveillance broadcast system (ADS-B), or any other suitable radio communication system that supports communications between the aircraft 102 and one or more external monitoring systems, air traffic control, and/or another command center or ground station 104. In this regard, the communications system 120 may allow the aircraft 102 to receive information that would otherwise be unavailable to the pilot and/or co-pilot using the onboard systems 110, 112, 114, 116.

In various embodiments, the navigation system 110, avionics system(s) 112, onboard sensor system(s) 114, and communications system 120, are coupled to the display system 118 such that the display system 118 may generate or render, on a display device 40, real-time information associated with the respective components. In this manner, the navigation system 110, avionics system(s) 112, onboard sensor system(s) 114, and communications system 120 are configured to support navigation, flight planning, and other aircraft control functions in a conventional manner, as well as to provide real-time data and/or information regarding the operational status of the aircraft 102 to the trigger module 50.

In exemplary embodiments, the display device 40 is realized as one or more electronic displays capable of graphically rendering flight information or other data associated with operation of the aircraft 102. The display device 40 is configured to be responsive to display commands from the display system 118 and/or trigger module 50. In this regard, the trigger module 50 and the display system 118 are cooperatively configured to generate the display commands for the display device 40 to display, render, or otherwise convey thereon one or more graphical representations or images associated with operation of the aircraft 102, and the various menu selections on the display device 40. For example, the display device 40 may render a lateral, navigational map (navigation display, ND) that includes a graphical representation of the aircraft 102 and one or more of the terrain, meteorological conditions, airspace, air traffic, navigational reference points, and a route associated with a lateral flight plan of the aircraft 102. The display device 40 may also render a vertical map, or vertical situation display (VSD), that includes a graphical representation of the aircraft 102 and one or more of the airspace, air traffic, navigational reference points, and a vertical flight plan associated with a flight plan of the aircraft 102.

The data storage element or database DB1 122 may maintain information regarding airports and/or other potential landing locations (or destinations) for the aircraft 102. In this regard, the DB1 122 maintains an association between a respective airport, its geographic location, runways (and their respective orientations and/or directions), instrument procedures (e.g., approaches, arrival routes, and the like), airspace restrictions, and/or other information or attributes associated with the respective airport (e.g., widths and/or weight limits of taxi paths, the type of surface of the runways or taxi path, and the like). Additionally, in accordance with one or more embodiments, the DB1 122 also maintains airport status information for the runways and/or taxi paths at the airport indicating whether or not a particular runway and/or taxi path is currently operational along with directional information for the taxi paths (or portions thereof). The DB1 122 may also be utilized to store or maintain other information pertaining to the airline or aircraft operator (e.g., contractual agreements or other contractual availability information for particular airports, maintenance capabilities or service availability information for particular airports, and the like) along with information pertaining to the pilot and/or co-pilot of the aircraft (e.g., experience level, licensure or other qualifications, work schedule or other workload metrics, such as stress or fatigue estimates, and the like).

With continued reference to FIG. 1, the GS system 108 is external to the platform 102, such as at a ground station 104. The GS module 60 is configured to generate the platform-specific configuration file (CF). The GS module 60 may be operatively coupled to a GS communications system 150, a GS user interface 152, a trigger logic library 154, and an aircraft (A/C) specific parameters database 156. The GS communications system 150 and the GS user interface 152 may be functionally equivalent to the user interface 116 and communication system(s) 120 described above.

The provided trigger logic library 154 includes a first plurality of predefined trigger logic modules, each being platform-specific and directed to one or more categories from the set including: safety, engine status, fault detection, and avionic system status. Each trigger logic module may comprise a trigger identity and a default time for recording data bus 51 activity. The trigger logic library 154 is organized to be reused by multiple users, and the trigger logic modules may be determined well in advance of configuration file generation. The A/C specific parameters database 156 stores component information associated with various aircraft models.

Figure 2:
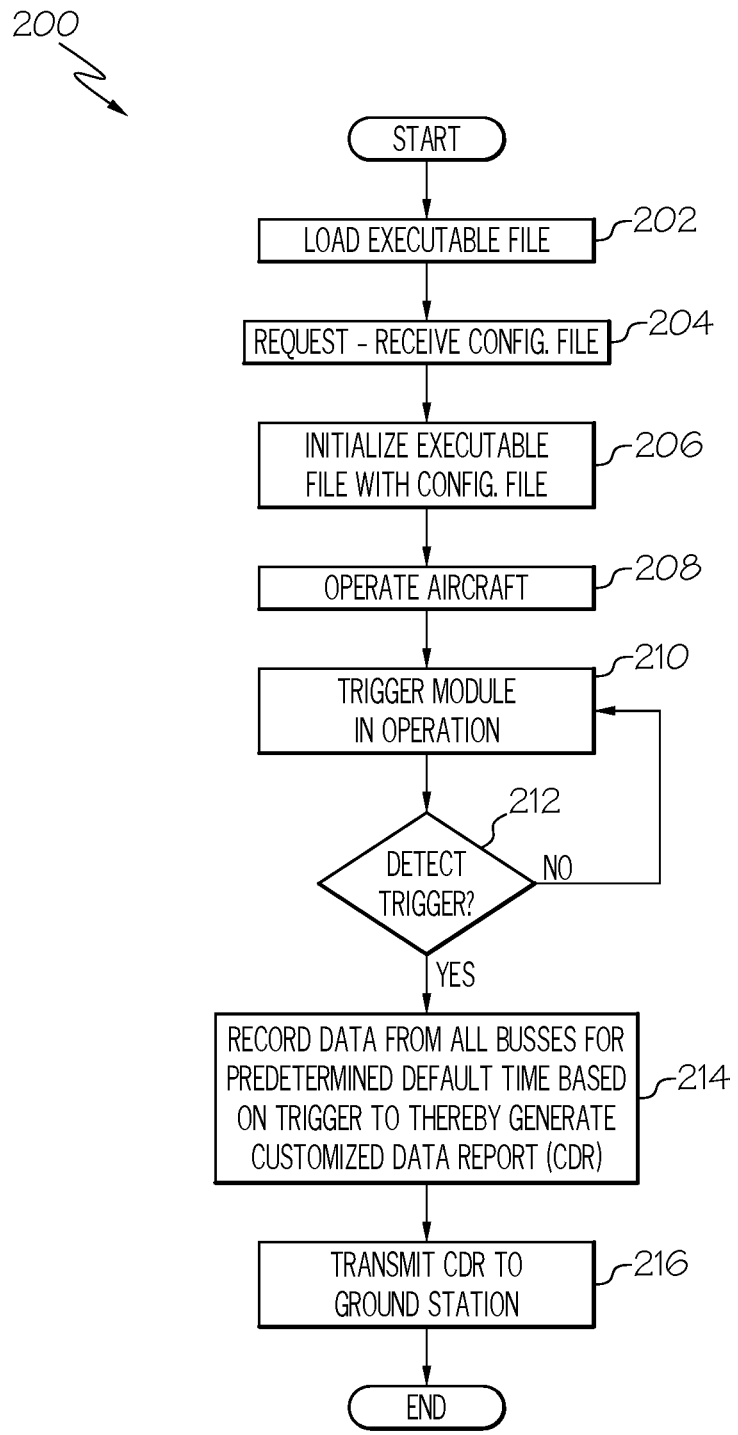
FIG. 2 and FIG. 3 are flow charts for a method for data recording for a platform, in accordance with an exemplary embodiment.
Figure 3:
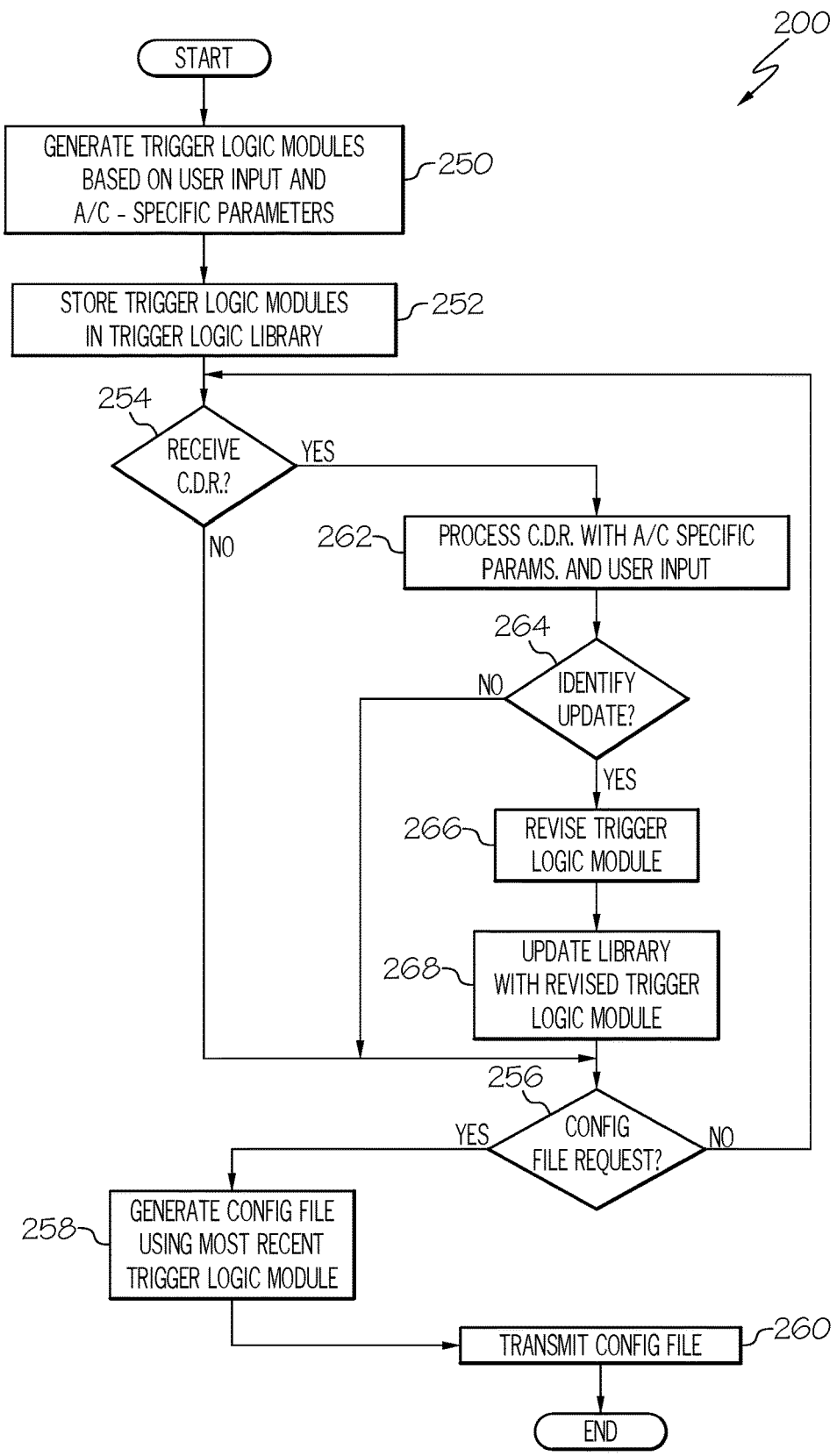

As mentioned, the data reporting system 100 may be used to implement a method 200, as shown in the flow charts of FIG. 2 and FIG. 3. For illustrative purposes, the following description of method 200 may refer to elements mentioned above in connection with FIG. 1. In practice, portions of method 200 may be performed by different components of the described system. It should be appreciated that method 200 may include any number of additional or alternative tasks, the tasks shown in FIG. 2 and FIG. 3 need not be performed in the illustrated order, and method 200 may be incorporated into a more comprehensive procedure or method having additional functionality not described in detail herein. Moreover, one or more of the tasks shown in FIG. 2 and FIG. 3 could be omitted from an embodiment of the method 200 as long as the intended overall functionality remains intact.

Before the method 200 starts, it is understood that the data reporting system 100 is initialized. Initialization generally comprises uploading or updating instructions and applications as required for operation of the trigger system 106 and as required for operation of the GS system 108. This may include: authentication protocols used in connection with the communications link 105; the executable programs 22 and 32; the DB1 122; the A/C specific parameters database 156; and, any associated stored variables. In various embodiments, initialization comprises uploading an initial trigger logic library 154 and an initial configuration file CF. The initial configuration file is created from the trigger logic library.

At 202, executable program 22 is loaded into memory in the trigger module 50. At 204, the trigger module 50 receives an aircraft-specific configuration file. Receiving the aircraft (A/C) specific configuration file may be responsive to first having requested it. At 206, the executable program 22 is initialized with the received A/C specific configuration file (CF). At 208, the A/C is in operation. At 210, the trigger module 50 is in operation. Accordingly, at 210, the trigger module 50 is receiving and processing data and information from one or more of the navigation system 110, one or more avionics systems 112, one or more on-board sensor systems 114, the user interface 116, the communications system 120, and one or more data storage elements (DB 1) 122. While the trigger module 50 is in operation at 210, it is monitoring the received data and information for triggers, i.e., it is processing any combination of: the avionics data, the navigation data, the sensor data, and the communications data, with the CF to: determine (a) that a trigger occurred, and (b) a corresponding trigger identity. When a trigger is detected at 212, the trigger identity is used to employ the associated predetermined default time to record data bus activity. Data bus activity is then recorded for the associated default time, creating, in conjunction with the trigger identity, a first block of data. The customized data report (CDR) is generated from the first block of recorded data bus activity. At 214, the CDR and/or the first block of data bus activity may also be stored. At 216, the CDR is transmitted to the GS system 108. As mentioned, transmission of information between the GS system 108 and the aircraft 102 may comprise first establishing an authenticated connection. In some embodiments, the transmission at 216 occurs after the aircraft 102 has completed its flight. In other embodiments, the transmission at 216 may occur during flight.

As may be readily understood, subsequent to recording data at 214, the method may return to 210 and continue monitoring received data and information for triggers. A subsequent trigger may result in a subsequent block of recorded data. The subsequent block of recorded data may be appended to the first block of recorded data, and the generated CDR may include the first block of recorded data and the second block of recorded data. This process may continue until the aircraft 102 lands.

With reference to FIG. 3, GS 108 tasks are described. At 250, trigger logic is generated. The trigger logic comprises multiple trigger logic modules that are generated using A/C specific parameters and user input. At 252 the trigger logic is stored in the trigger logic library 154. If there has not been a receipt of a CDR at 254, and a configuration file (CF) request arrives at 256, then a CF is generated using the files in the trigger logic library 154. At 260, the CF is transmitted.

However, when a CDR is received at 254, then the CDR may be processed with A/C specific parameters and user input at 262 to identify updates to trigger logic modules at 264. At 262 and 264, the user input may be responsive to a technical review of the CDR and A/C specific parameters. The technical review of the CDR and A/C specific parameters may include the GS module 60 further being configured to: identify the trigger; and prompt a technical review of the trigger and associated record of data bus activity. Users, such as engineers and technicians, may perform the technical reviews, identify updates (264), and revise individual trigger logic modules (266). The trigger logic library 154 is continually updated (268) with revised trigger logic modules. Accordingly, the trigger logic library 154 is current, and a request for a configuration file at 256 initiates the generation of a configuration file (258) and transmission of a configuration file (260) that reflects the most recent trigger logic modules.

The referenced users may be platform customers, original equipment manufacturers (OEMs), manufacturers of individual aircraft systems and components, engineers, technicians, and the like. The user input associated with a request for a configuration file at 256 may represent a first user-specific selection of trigger logic modules in the trigger logic library. The user input at 262 (associated with a technical review of the CDR) may or may not be from the same user as the user that provided the user input at 256.

As is readily understandable, with any given group of users, there may be some reused and/or repeatedly used trigger logic modules. For example, a user requesting a first CF may be one of a plurality of users. In this scenario, the method 200 and system 100 are further configured to: receive, from each of the plurality of users, a respective user-specific selection of the trigger logic modules; generate a respective plurality of CF, each CF of the plurality of CF being responsive to a respective one of the user-specific selections of trigger logic modules; and transmit each CF of the plurality of CFs to its respective user. The system and method may further store the plurality of user-specific CF for future analysis. At 264, responsive to identifying a trigger update, the method 200 may revise each CF of the plurality of stored CFs responsive to the revised trigger logic. As mentioned, these updates to the trigger logic library and to the CFs are performed off-platform.

Also mentioned, the trigger system 106 may employ an audio system 132, configured to continuously detect audible emissions and ambient noise in the platform and generate audio data based thereon. In addition to enabling the above described functions, program 22 enables the trigger module 50 to receive and process the audio data to distinguish between spoken commands and ambient cabin noises; and identify the trigger from among either the spoken commands or the ambient cabin noises. As with the previous examples, the trigger module 50 may monitor the audio data to determine (a) that the trigger occurred, and (b) the trigger identity based on processing the audio data with the CF. Accordingly, the trigger logic library 154 may comprise audio trigger logic modules. Audio trigger logic modules comprise trigger identifications associated with various words, phrases, types of sounds, and loudness (decibel) thresholds, and provide associated default record times as described herein.

Additionally, the trigger module 50 may process received user input data to determine that a user has manipulated a user input device 130 to force a trigger. In this scenario, the identified trigger is a user initiated trigger, and again, a predetermined default record time may be employed. In other embodiments, the user may force the trigger, and also force the amount of record time. Responsive thereto, the trigger module 50 records all data bus activity for the required amount of time, and the CDR is generated as before.

Accordingly, the exemplary embodiments discussed above provide a technologically improved method and system to record data during operation of an aircraft 102. A technological benefit of the provided data recording systems and methods is the leaning-out of the onboard software (program 22) by moving bulky and frequently changing software (program 32) to a ground system (GS) 108. Specifically, having the frequently changing software (program 32) reside external to the aircraft 102 means that (i) the trigger logic library 154 may be frequently revised without necessitating recertification of the onboard software (program 22), and (ii) trigger logic modules may be selected and reused on an as-needed basis.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A data reporting system for a platform, the system comprising:
   a navigation system providing navigation data;
   an avionics system providing avionics data;
   a trigger module operatively coupled to the navigation system and the avionics system, and configured to process a platform-specific configuration file (CF) during platform operation and generate therefrom a customized data report (CDR); and
   a ground station (GS) module external to the platform, the GS module configured to generate the platform-specific configuration file (CF);
   and wherein
      the trigger module is configured to:
         process the avionics data and the navigation data with the CF to:
            determine (a) that a trigger occurred, and (b) a trigger identity;
            responsive to determining that a trigger occurred, record data bus activity for a duration of time associated with the trigger identity in the CF;
            generate the CDR including the record of data bus activity; and
         transmit the CDR to the GS module via a wireless communication link; and
      the GS module is configured to:
         reference trigger logic in a trigger logic library and aircraft (A/C) specific parameters based on a first user input to generate therefrom the platform-specific CF, wherein the trigger logic includes a first plurality of predefined trigger logic modules, each being platform-specific and directed to one or more categories from the set including: safety, engine status, fault detection, and avionic system status; and
         transmit the CF to the trigger module via the wireless communication link; and
         responsive to receiving the CDR,
            (a) process the CDR with a second user input to thereby identify a trigger logic update; (b) update a trigger library with a revised trigger logic; and (c) revise the CF responsive to the revised trigger logic;
   wherein the first user input represents a first user-specific selection of trigger logic modules in the trigger logic library, and the second user input is responsive to a technical review of the CDR and A/C specific parameters; and
wherein the GS module is further configured to:
  receive, from each of a plurality of users, a respective user-specific selection of the trigger logic modules;
  generate a respective plurality of CF responsive to each of the user-specific selections of trigger logic modules; and
  store the plurality of user-specific CF.

2. The system of claim 1, wherein the technical review of the CDR and A/C specific parameters comprises the GS module further being configured to identify the trigger.

3. The system of claim 2, wherein the technical review of the CDR and A/C specific parameters comprises the GS module further being configured to prompt a technical review of the trigger and associated record of data bus activity.

4. The system of claim 1, wherein, responsive to identifying a trigger update, the GS module is further configured to revise each CF of the plurality of stored CFs responsive to the revised trigger logic.

5. A data reporting system for a platform, the system comprising:
  a navigation system providing navigation data;
  an avionics system providing avionics data;
  a trigger module operatively coupled to the navigation system and the avionics system, and configured to process a platform-specific configuration file (CF) during platform operation and generate therefrom a customized data report (CDR); and
  a ground station (GS) module external to the platform, the GS module configured to generate the platform-specific configuration file (CF);
  and wherein
    the trigger module is configured to:
      process the avionics data and the navigation data with the CF to:
        determine (a) that a trigger occurred, and (b) a trigger identity;
        responsive to determining that a trigger occurred, record data bus activity for a duration of time associated with the trigger identity in the CF;
        generate the CDR including the record of data bus activity; and
      transmit the CDR to the GS module via a wireless communication link; and
    the GS module is configured to:
      reference trigger logic in a trigger logic library and aircraft (A/C) specific parameters based on a first user input to generate therefrom the platform-specific CF, wherein the trigger logic includes a first plurality of predefined trigger logic modules, each being platform-specific and directed to one or more categories from the set including: safety, engine status, fault detection, and avionic system status, and wherein the first user input represents a first user-specific selection of trigger logic modules in the trigger logic library; and
      transmit the CF to the trigger module via the wireless communication link; and
      responsive to receiving the CDR,
        (a) process the CDR with a second user input to thereby identify a trigger logic update; (b) update a trigger library with a revised trigger logic; and (c) revise the CF responsive to the revised trigger logic;
further comprising an audio system configured to continuously detect audible emissions in the platform and generate audio data based thereon, and wherein the trigger module is further configured to determine (a) that the trigger occurred, and (b) the trigger identity based on processing the audio data with the CF.

6. The system of claim 5, wherein the trigger module is further configured to:
  process the audio data to distinguish between spoken commands and ambient cabin noises; and
  identify the trigger from among either the spoken commands or the ambient cabin noises.

7. A method for data reporting for a platform, the method comprising:
  at a trigger module,
    receiving navigation data;
    receiving avionics data;
    processing the avionics data and the navigation data with a platform-specific configuration file (CF) during platform operation to determine (a) whether a trigger occurred, and (b) a trigger identity;
    responsive to determining that a trigger occurred, (i) recording data bus activity for a duration of time associated with the trigger identity, (ii) generating a customized data report (CDR) including the record of data bus activity; and (iii) transmitting the CDR to a ground station (GS) module external to the platform, via a wireless communication link; and
  at the ground station (GS) module,
    referencing trigger logic in a trigger logic library and aircraft (A/C) specific parameters based on a first user input to generate therefrom the platform-specific CF, wherein the first user input represents a first user-specific selection of trigger logic modules in the trigger logic library;
    transmitting the CF to the trigger module via the wireless communication link; and
    responsive to receiving the CDR,
      (a) processing the CDR with a second user input to thereby identify a trigger logic update; and,
      (b) updating a trigger library with a revised trigger logic;
  wherein the trigger logic includes a first plurality of predefined trigger logic modules, each being platform-specific and directed to one or more categories from the set including: safety, engine status, fault detection, and avionic system status.

8. The method of claim 7, wherein the technical review of the CDR and A/C specific parameters comprises, at the GS module, identifying the trigger.

9. The method of claim 8, wherein the technical review of the CDR and A/C specific parameters comprises, at the GS module, prompting a technical review of the trigger and associated record of data bus activity.

10. The method of claim 9, wherein the second user input is responsive to a technical review of the CDR and A/C specific parameters.

11. The method of claim 10, further comprising, at the GS module:
  receiving, from each of a plurality of users, a respective user-specific selection of the trigger logic modules; and
  generating a respective plurality of CF responsive to each of the user-specific selections of trigger logic modules.

12. The method of claim 11, further comprising:
at the GS module,
   storing the plurality of user-specific CF; and
   responsive to identifying a trigger update, revising each CF of the plurality of stored CFs responsive to the revised trigger logic.

13. The method of claim 12, further comprising:
at the trigger module,
   continuously detecting audible emissions in the platform, and generating audio data based thereon; and
   determining, based on processing the audio data with the CF, (a) that the trigger occurred, and (b) the trigger identity.

14. The method of claim 13, further comprising, at the trigger module:
   processing the audio data to distinguish between spoken commands and ambient cabin noises; and
   identifying the trigger from among either the spoken commands or the ambient cabin noises.

15. A method for data reporting for an aircraft, the method comprising:
at a ground station (GS) module external to the aircraft,
   creating a trigger library comprising multiple trigger logic modules based on a first user input and aircraft specific parameters, the trigger logic modules each being platform-specific and directed to one or more categories from the set including: safety, engine status, fault detection, and avionic system status;
   generating an aircraft-specific configuration file (CF) based on a second user input and the trigger logic library; and
   transmitting the CF to a trigger module in the aircraft via a wireless communication link; and
at the trigger module,
   receiving the platform-specific configuration file (CF);
   receiving navigation data, avionics data, and sensor system data;
   processing the avionics data, the navigation data, and the sensor system data with the (CF) during aircraft operation to monitor for triggers;
   determining (a) that a trigger occurred, and (b) a trigger identity; and
   responsive to determining that the trigger occurred, (i) recording data bus activity for a duration of time associated with the trigger identity, (ii) generating a customized data report (CDR) including the record of data bus activity; and (iii) transmitting the CDR to the GS module; and
further comprising, at the GS module:
   receiving, from each of a plurality of users, a respective user-specific selection of the trigger logic modules; and
   generating a respective plurality of CF, each CF of the plurality of CF being responsive to a respective one of the user-specific selections of trigger logic modules.

* * * * *